No. 762,019.
PATENTED JUNE 7, 1904.
J. W. BERRY.
WIRE FENCE.
APPLICATION FILED DEC. 18, 1903.
NO MODEL.
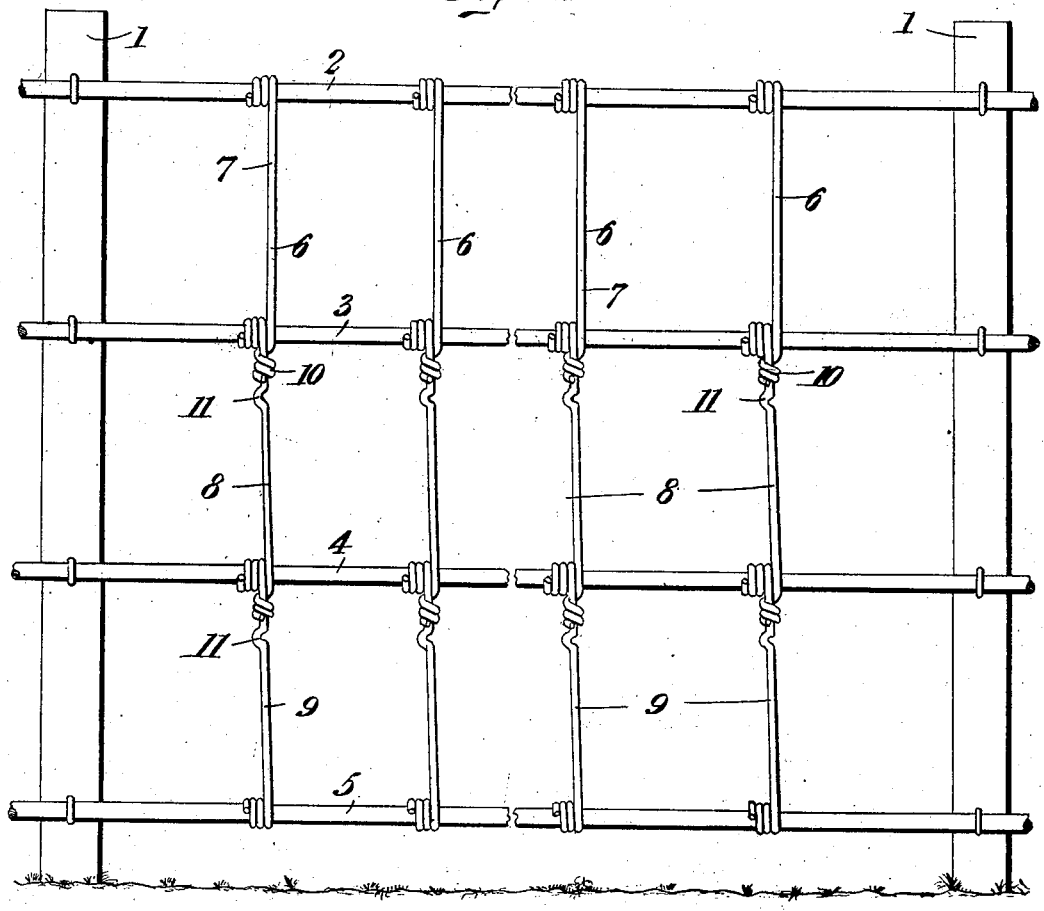
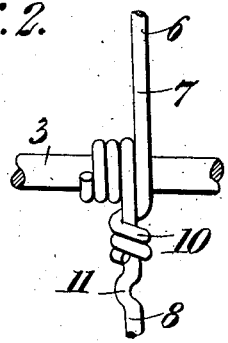
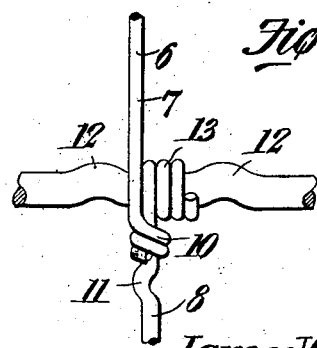
Witnesses
James W. Berry
Inventor
by
Attorneys No. 762,019.

Patented June 7, 1904.

UNITED STATES PATENT OFFICE.

JAMES W. BERRY, OF IOWA CITY, IOWA.

WIRE FENCE.

SPECIFICATION forming part of Letters Patent No. 762,019, dated June 7, 1904.

Application filed December 18, 1903. Serial No. 185,730. (No model.)

*To all whom it may concern:*

Be it known that I, JAMES W. BERRY, a citizen of the United States, residing at Iowa City, in the county of Johnson and State of Iowa, have invented a new and useful Wire Fence, of which the following is a specification.

My invention relates to wire fences, and has for its objects to produce a comparatively simple inexpensive device of this character which will be strong and durable and in practice effectually withstand the strains to which it is subjected and one in which the stay or filler wires will be susceptible of longitudinal contraction, thereby rendering the fabric yieldable in a vertical direction or longitudinally of the filler-wires.

To these ends the invention comprises the novel features of construction and combination of parts more fully hereinafter described.

In the accompanying drawings, Figure 1 is an elevation of a portion of a wire fence embodying my invention. Fig. 2 is an enlarged detail view of the line and stay wires at one of the joints. Fig. 3 is a view similar to Fig. 2, showing a slightly-modified form of embodiment of the invention.

Referring to the drawings, 1 1 designate a pair of fence-posts, disposed, respectively, at opposite ends of the fence course, and 2, 3, 4, and 5 the horizontal line or strand wires, spaced vertically one above another and extended between the posts, to which they are attached in any suitable manner, while 6 is the vertical stay or filler wires, attached to and intersecting the horizontal strand-wires. These parts, except as hereinafter specified, may all be of the usual or any preferred construction and material. The stay or filler wires are in accordance with my invention each composed of a plurality of sections or lengths 7, 8, and 9, which extend each between a pair of the line-wires and are of a length somewhat greater than the distance between the latter wires.

In practice the sections 7, 8, and 9 are arranged in parallel continuance and preferably with their meeting ends approaching each other on the same side of the line-wires to which they are attached, the meeting ends of the sections being united one with another, thus producing, in effect, continuous unbroken wires. As seen in Fig. 1, the sections 7, 8, and 9 are attached to the line-wires by wrapping the upper end of section 7 around the uppermost line-wire 2, the upper end of section 8 around the next line-wire 3, and the opposite ends of section 9 around the wires 4 and 5, respectively. The stay-wire sections are then connected by wrapping the initially-free end of section 7 around the body of section 8 and the initially-free end of the latter around the body of section 9, the ends of the sections being wrapped in the form of knots or coils 10, which are free to slide on and longitudinally of the respective sections to a limited extent, being limited in their upward movement by contact with the adjacent line-wires and in their downward movement by a stop or abutment produced by forming a crimp 11 in the sections beneath the knots or coils 10.

In Fig. 3 the line-wires are crimpled, as at 12, to produce stops upon the opposite sides of the knot or coil 13 of the filler-wire where the end of the latter is wrapped around the line-wire, and this in order to prevent lateral displacement of the filler-wire at the point of its connection with the line-wire. Otherwise the construction and operation is identical with that above described, it being noted that in both forms of the device longitudinal extension of the sections relatively is prevented, while at the same time said sections may have a relative longitudinal contractive movement to yield under vertical downward pressure, such movement, however, being limited by means of the stops 11.

From the foregoing it is apparent that I produce a device of simple construction which in practice will efficiently perform its functions to the attainment of the ends in view. It is to be understood that I do not limit myself to the precise details herein set forth, as minor changes may be made without departing from the spirit of the invention.

Having thus described my invention, what I claim is—

1. A fence comprising a line-wire and a filler-wire composed of a plurality of sections, the end of one filler-wire section being wrapped upon the line-wire and the meeting end of the other filler-wire section being wrapped upon the body of the first-named section to produce a knot adapted for movement longitudinally of said section, and a stop provided on the section for limiting the movement of the knot in one direction its movement in the other direction being limited by the line-wire.

2. A fence comprising a line-wire having spaced stops provided thereon and a filler-wire composed of a plurality of sections, the end of one filler-wire section being wrapped upon the line-wire between the stops and the meeting end of the other filler-wire section being wrapped upon the body of the first-named section to produce a knot adapted for movement longitudinally of said section, and a stop provided on the section for limiting the movement of the knot in one direction, its movement in the other direction being limited by the line-wire.

3. A fence comprising a line-wire having spaced crimps producing stops thereon and a filler-wire composed of a plurality of sections, one end of one filler-wire section being wrapped upon the line-wire between the crimps and the meeting end of the other filler-wire section being wrapped upon the body of the first-mentioned section to produce a knot adapted for movement longitudinally of said section, and a crimp formed in the latter section to produce a stop for limiting the movement of the knot in one direction, its movement in the other direction being limited by the line-wire.

In testimony that I claim the foregoing as my own I have hereto affixed my signature in the presence of two witnesses.

JAMES W. BERRY.

Witnesses:
R. P. HOWELL,
A. M. SHAFF.